US009892390B2

(12) United States Patent
Schnell et al.

(10) Patent No.: US 9,892,390 B2
(45) Date of Patent: Feb. 13, 2018

(54) DIGITAL CONTENT PACKAGING, LICENSING AND CONSUMPTION

(75) Inventors: Patrik Schnell, Issaquah, WA (US); Alexandre V. Grigorovitch, Redmond, WA (US); James M. Alkove, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 2247 days.

(21) Appl. No.: 11/954,222

(22) Filed: Dec. 12, 2007

(65) Prior Publication Data

US 2009/0157552 A1 Jun. 18, 2009

(51) Int. Cl.
 G06F 21/00 (2013.01)
 G06Q 20/12 (2012.01)
 G06Q 30/02 (2012.01)

(52) U.S. Cl.
 CPC ......... G06Q 20/1235 (2013.01); G06Q 30/02 (2013.01)

(58) Field of Classification Search
 CPC ............................ G06Q 20/1235; G06Q 30/02
 USPC ............................................. 705/51, 59, 14.4
 See application file for complete search history.

(56) References Cited

U.S. PATENT DOCUMENTS

| 5,629,980 A * | 5/1997 | Stefik et al. ............. 705/54 |
| 5,892,900 A * | 4/1999 | Ginter et al. ............ 726/26 |
| 6,343,738 B1 * | 2/2002 | Ogilvie ............. G06Q 20/02 235/380 |
| 6,697,944 B1 | 2/2004 | Jones et al. |
| 7,065,507 B2 | 6/2006 | Mohammed et al. |
| 7,225,333 B2 | 5/2007 | Peinado et al. |
| 7,681,243 B2 * | 3/2010 | Kim ............. G06Q 30/02 713/168 |
| 7,853,478 B2 * | 12/2010 | Donahue ............. G06Q 30/02 705/1.1 |
| 7,925,739 B2 * | 4/2011 | Kocho et al. ......... 709/224 |

(Continued)

OTHER PUBLICATIONS

Mooney et al. "Digital Rights Management Business and Technology", Copyright 2002, M&T Books.*

(Continued)

Primary Examiner — Steven S Kim
(74) Attorney, Agent, or Firm — Karin L. Williams; Mayer & Williams PC

(57) ABSTRACT

A DRM technique involves packaging an advertisement using a data structure that encapsulates a number of advertising segments along with signed information, such as a table of hashes, associated with some of the advertising segments. In one scenario, the data structure and the signed information are separately protected using public key and/or digital signature cryptographic schemes. The advertisement is delivered to a user of a consumer electronic device (CED) separately from delivery of a digital license, which governs user consumption of the advertisement. The digital license includes keys used in connection with the cryptographic scheme, and references a condition to be satisfied with respect to consumption of the advertisement. As advertising segments are verified and consumed by the user/CED, information is recorded and used to determine whether the license condition was satisfied. Satisfaction of the license condition may result in access to program content or additional licenses.

13 Claims, 4 Drawing Sheets

(56) References Cited

U.S. PATENT DOCUMENTS

| | | | |
|---|---|---|---|
| 8,245,310 B2* | 8/2012 | Grigorovitch et al. | 726/28 |
| 2002/0114466 A1* | 8/2002 | Tanaka | G06F 21/10 380/232 |
| 2003/0149618 A1* | 8/2003 | Sender | G06Q 30/02 705/14.55 |
| 2004/0003398 A1* | 1/2004 | Donian et al. | 725/34 |
| 2004/0010602 A1 | 1/2004 | Van Vleck et al. | |
| 2004/0107435 A1* | 6/2004 | Anzai | H04N 7/17318 725/35 |
| 2004/0128499 A1 | 7/2004 | Peterka et al. | |
| 2004/0255123 A1* | 12/2004 | Noyama et al. | 713/176 |
| 2005/0114205 A1* | 5/2005 | Nelson et al. | 705/14 |
| 2005/0268346 A1 | 12/2005 | Lee et al. | |
| 2006/0036551 A1* | 2/2006 | Oliveira et al. | 705/51 |
| 2006/0062426 A1* | 3/2006 | Levy et al. | 382/100 |
| 2006/0100924 A1* | 5/2006 | Tevanian, Jr. | 705/14 |
| 2006/0173783 A1 | 8/2006 | Marples et al. | |
| 2006/0259433 A1* | 11/2006 | Lahtinen et al. | 705/57 |
| 2006/0259982 A1 | 11/2006 | Upendran | |
| 2006/0265758 A1 | 11/2006 | Khandelwal et al. | |
| 2007/0098165 A1* | 5/2007 | Yoshikawa | 380/211 |
| 2007/0122111 A1* | 5/2007 | Yamamoto | G11B 20/00086 386/244 |
| 2007/0124201 A1* | 5/2007 | Hu et al. | 705/14 |
| 2007/0136205 A1 | 6/2007 | Przybilla | |
| 2007/0174919 A1 | 7/2007 | Raines et al. | |
| 2008/0005034 A1* | 1/2008 | Kravitz | G06F 21/10 705/59 |
| 2008/0010119 A1* | 1/2008 | Oliveira et al. | 705/14 |
| 2008/0016229 A1* | 1/2008 | Lee | G06Q 30/02 709/229 |
| 2008/0019516 A1* | 1/2008 | Fransdonk | 380/201 |
| 2008/0063195 A1* | 3/2008 | Li | 380/200 |
| 2008/0183624 A1* | 7/2008 | Grigorovitch et al. | 705/51 |
| 2008/0295128 A1* | 11/2008 | Aaltonen | G06F 21/10 725/32 |
| 2008/0320551 A1* | 12/2008 | Grigorovitch et al. | 726/1 |
| 2009/0006470 A1* | 1/2009 | Allard et al. | 707/104.1 |
| 2009/0031431 A1* | 1/2009 | Boccon-Gibod | 726/30 |
| 2009/0043659 A1* | 2/2009 | Lee | G06Q 30/0254 705/14.52 |
| 2009/0052860 A1* | 2/2009 | Derrenberger et al. | 386/46 |

OTHER PUBLICATIONS

Marvin L. Smith, "Digital Rights Management & Protecting the Digital Media Value Chain", Proceedings of the 3rd international conference on Mobile and ubiquitous multimedia, Date: 2004, pp. 187-191, ACM, New York, USA.

Michiels, et al., "Towards a Software Architecture for DRM", Proceedings of the 5th ACM workshop on Digital rights management, Date: 2005, pp. 65-74, ACM, New York, USA.

Nickolova, et al., "Verification and Application of Conceptual Model and Security Requirements on Practical DRM Systems in E-Learning", Date: 2007, vol. 1.

* cited by examiner

DIGITAL CONTENT PACKAGING, LICENSING AND CONSUMPTION

BACKGROUND

Many types of consumer electronic devices ("CEDs") can acquire and consume digital content. One type of digital content is media content, which is any image, video and/or audio content, along with any instructions relating thereto (for example, applications such as games), or any combination thereof, stored or distributed using digital techniques. Commercial media content (for example, movies, television shows, music, and the like) is referred to herein as "program content." Sometimes program content is protected from unauthorized uses, such as copying, in accordance with one or more digital rights management ("DRM") techniques. DRM-protected program content can be distributed by a variety of providers or network operators via a wide variety of wide-area and local-area networks. In many cases CEDs are able to interact with networks, and even other physically or virtually local CEDs, to receive and consume DRM-protected program content from a variety of sources almost anytime, anywhere they happen to be.

Advertising content is another type of digital content. Advertising content (in the form of media content such as audio/visual content or non-audio/visual content) embedded within program content broadcast over-the-air has traditionally been a source of revenue for entities in the broadcast programming supply chain. As advertising techniques have advanced, however, advertising content has also been adapted to support the business models of many other program content distributors, such as movie studios, cellular network operators, hosts of wide- or local-area network-based media distributors, cable network operators, streaming or broadcast media distributors, and others. For example, in some environments it is now possible to transmit advertising content separate from program content, target advertising to specific groups or individuals, implement interactive advertising features, and replace out-of-date advertisements with up-to-date advertisements.

Although advertising content and program content often share the same distribution channels, advertising content is often consumed differently than program content—while users generally actively seek to discover and consume new program content, they often attempt to avoid the consumption of advertising content. As such, program content providers and advertising content providers share some common interests and some divergent interests. For example, both program content providers and advertising content providers desire to ensure that attackers do not alter or replace distributed content. Program providers, however, are generally concerned with reducing the likelihood that users of CEDs will illegally over-consume or copy/share program content, while advertisers would like to ensure that users do in fact consume advertising content, and may be very happy if that consumption is excessive or if advertising content is copied or shared.

SUMMARY

The digital rights management "DRM" techniques described herein efficiently and simultaneously address the often diverse commercial and legal interests of different digital content providers and users of consumer electronic devices ("CEDs").

One technique involves the packaging of a digital content item or a portion thereof, such as a digital advertisement, which is composed of a number of ordered content segments playable by a particular CED as a content stream. Generally, the digital content item is packaged by an entity operating a content packaging server or service. One or more data structures is/are used to encapsulate the content segments, along with signed information based on at least some of the content segments. In one exemplary implementation, the information is a table, protected by a signature to protect against tampering, which is used to store hash values of information associated with arbitrarily or carefully selected content segments. A table may be stored in the header or the body portion of the data structure(s) encapsulating the content segments. Exemplary information for a particular content segment includes but is not limited to: a stream identifier, a sample identifier, a sample offset within the stream, and a hash length. The hash values are created using a predetermined hash algorithm.

Separately, a digital license is created and associated with the digital content item. The digital license is operative to grant one or more rights to en entity (such as the user of a particular CED) under one or more intellectual property rights. It will be understood that the digital license need not specifically grant rights under intellectual property rights associated with the digital content item—for example, the digital license may grant rights under intellectual property rights associated with a different digital content item such as a predetermined portion of program content, or may be linked to a separate license that grants rights under intellectual property rights associated with different digital content items.

Generally, the digital license is created by an entity operating a digital license server or service, and distributed to the user/CED desiring to access the digital content item before, during/with, or after distribution of the digital content item to the CED. The content packaging server or service responsible for packaging the digital content item may forward content protection information, including but not limited to cryptographic schemes and/or techniques used to protect the digital content item to the digital license server or service, for use in associating the digital license with the digital content item and/or use by a CED in connection with consumption of the digital content item. One manner of associating the digital license with the digital content item (illustrated herein for exemplary purposes) is by using the same security identifier in a portion of the digital content item and the digital license that is accessible by a CED. It will be appreciated, however, that any manner of ensuring that a license issuer can cryptographically authenticate that digital content was packaged by a particular packaging server or service may be used.

The digital license includes a condition to be satisfied with respect to consumption of the digital content item by a user of a CED. In one possible implementation, the condition may be specified with reference to a "verifiable segments list," which serves to identify certain content segments or expressions relating thereto to be verified and consumed pursuant to the condition. In one exemplary scenario, the signed information or a reference thereto (for example, the table of hash values or a digest of the table) is included in the digital license, serving as the verifiable segments list. In other exemplary scenarios, the verifiable segments list may be located with the digital content item (for example, in a header or a body portion of the data structure), the CED, or provided by a networked server or service. In another possible implementation, the condition is specified separately from a verifiable segments list, and the condition may indirectly identify the content segments or expressions relating thereto to be consumed to satisfy the condition—for example, such identification may be accomplished via reference to another location, such as a location within a portion of the data structure encapsulating the digital content item, the CED, or a location within a networked server or service.

In addition to the condition, the digital license also includes one or more keys, which are electronic items or techniques usable to verify information associated with digital content items protected by any cryptographic scheme or technique. In the exemplary implementation discussed herein, the keys usable to access content segments of digital content items and/or verify the integrity of the signed information are symmetric or asymmetric keys, which are encrypted within the digital license using a CED's public key. Keys are usable to verify information protected using cryptographic schemes such as digital signature schemes and/or to decrypt encrypted information. One exemplary key, referred to for discussion purposes herein as the "Header Integrity Key" ("HIKey"), is used before or during the CED's consumption of the digital content item to verify that certain aspects of the data structure(s) encapsulating the digital content item have not been tampered with. In the exemplary scenario in which a portion of the data structure containing the signed information and/or a reference thereto are protected using a digital signature, the HIKey is a public key that is input (by the CED or a separate network-based verification server or service)—along with the digital signature and the purportedly signed information—to a signature verifying algorithm that either verifies or rejects the digital signature. Another exemplary key, referred to as the "Content Authentication Key" ("CAKey"), is used to verify the signed information (for example, the table and/or hash values) during the CED's consumption of the digital content item. In one exemplary implementation, the CAKey is a symmetric or asymmetric key (optionally encrypted using the CED's public key) that is accessible once the digital signature is verified using the HIKey. The CAKey is input (by the CED or a network-based verification server or service), along with the purportedly hashed information, to a hash verification algorithm that either verifies or rejects the signed information. Optionally, additional keys may be included in the digital license. For example, when the digital license grants rights under intellectual property rights associated with a different digital content item, or is linked to a separate license that grants such rights, an exemplary key referred to as the "Primary Content Key" ("PCKey") may be used to access the different digital content items and/or separate license(s). In one exemplary implementation, the PCKey is a symmetric or asymmetric key (optionally encrypted using the CED's public key) that is accessible once the license condition is satisfied.

Assuming that the digital content item has not been tampered with, as the user/CED consumes content segments of the digital content item, information regarding the consumed content segments is recorded, either by the CED itself or a network-based server or service. When consumption of the digital content item has concluded, it can be determined whether the recorded information indicates that the condition specified by the digital license was satisfied. Based on whether the condition was satisfied, the user/CED may be granted or denied permission to access different digital content items and/or separate licenses (accessing and using the PCKey(s) with the digital license, for example).

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

The digital rights management ("DRM") techniques discussed herein relate to packaging of digital content items (which may be, or may include, portions of what would be considered larger works) such as program content items and advertising content items, and digital licenses therefor, in a manner that enables cryptographically robust authentication of content, flexible user consumption models, and simultaneous support of the often diverse commercial and legal interests of program content providers, advertising content providers, and users of consumer electronic devices ("CEDs").

Figure 1:
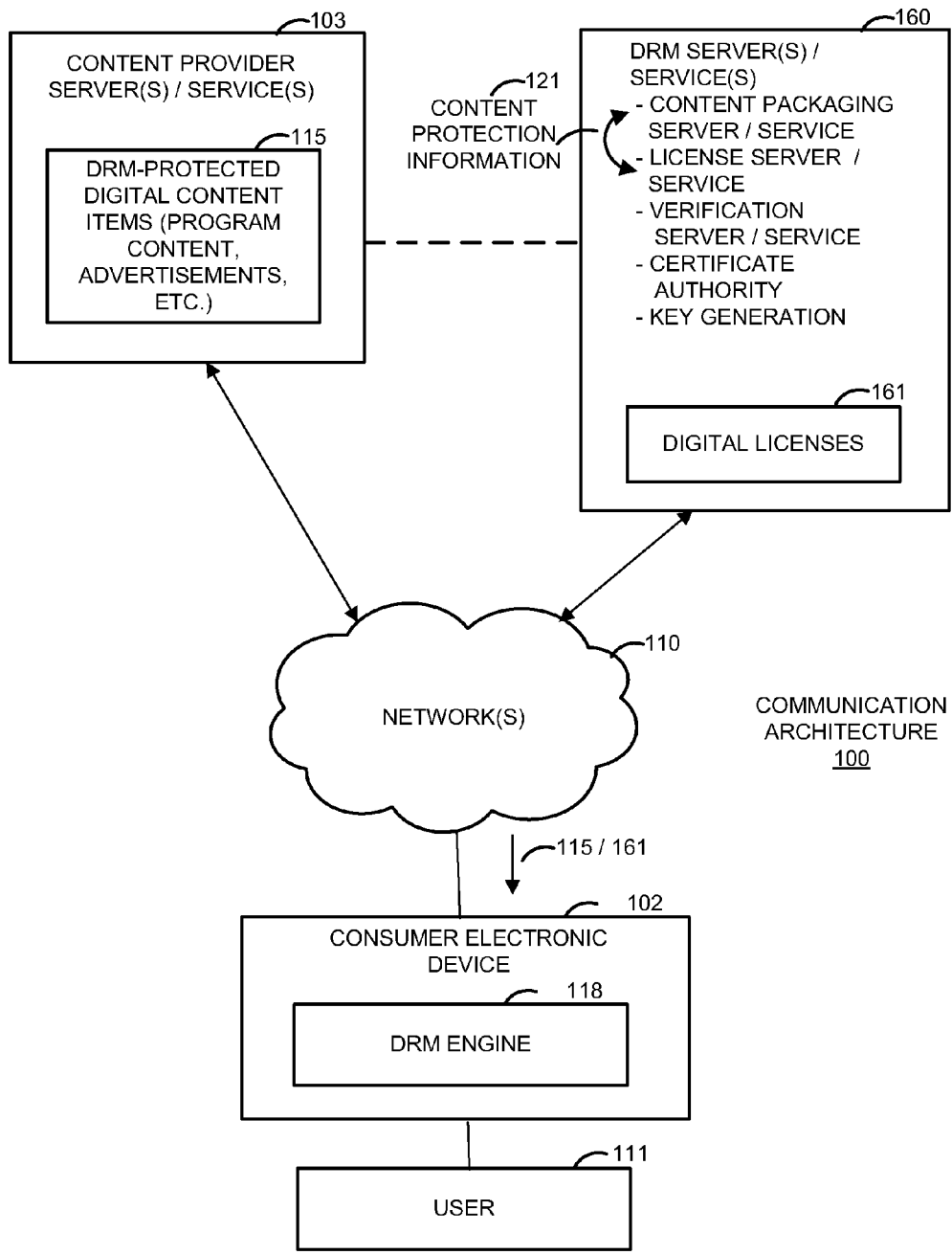
FIG. 1 is a simplified block diagram of a communication architecture 100 via which DRM-protected digital content is distributed and consumed.

Turning to the drawings, where like numerals designate like components, FIG. 1 is a simplified block diagram of a communication architecture 100 via which digital rights management ("DRM")-protected digital content items 115 from content provider server(s)/service(s) 103 or peer devices (not shown) are distributed (via network(s) 110) to, and consumed by, consumer electronic devices ("CEDs") 102 (one shown) operated by users 111 (one shown). CEDs 102 have DRM engines 118 that manage consumption of DCIs 115 in accordance with the terms of digital licenses 161 provided by DRM server(s)/services(s) 160.

Digital content items ("DCIs") 115 represent any commercial digital content, including but not limited to media content such as audio files, video files, image files, multimedia files, playlists, metadata, applications, and the like. Generally, DCIs are composed of a number of ordered content segments (for example, time-ordered or numerically-ordered content segments), which are playable by a particular CED as a content stream or executed as an application. It will be understood that a particular digital content item may be, or may include, portions of what would be considered a larger work (such as a portion of a broadcast program). As such, a single digital content item may be composed of multiple, separate groups of content segments; alternatively, individual groups of content segments may be treated as separate digital content items. Generally, each content segment can be uniquely identified using one or more of the following items of information: a stream identifier; a content sample identifier; an offset location of the content sample within the stream; and/or a content sample size. DCIs 115 may exist in any known or later developed format or combination of formats, and may be protected by one or more enforceable intellectual property rights of one or more entities, such as copyrights, patent rights, trademark rights, or trade secret rights.

One exemplary type of media content DCI is advertising content and metadata associated therewith. Another exemplary type of media content DCI is program content (for example, movies, television shows, music, and the like) and metadata associated therewith. Examples of metadata include but are not limited to information such as source information, targeting/consumer information, content segment information, expiration data information, hyperlinked information from third parties (such as reviews and the like), presentation schedule information, duration information, playback speed information, file size information, and format information.

Content provider server(s)/service(s) 103 represent any sources of DCIs, including but not limited to data storage services, digital media content sources (for example, music or video downloading, broadcasting, or on-demand services, media production or distribution entities or services, or advertising production or distribution entities or services), peer devices or services, and the like. In the context of program content and advertising content, a number of content providers may directly or indirectly collaborate to determine the appropriate association of digital advertisements with program content with which the digital advertisements are presentable. Such association may occur at many places in a media distribution pipeline, and even in real-time as program content is being consumed.

DRM server(s)/service(s) represent any network-side implementations of any known or later developed DRM systems or techniques (for example, Microsoft® Windows Media® Digital Rights Management systems or techniques and/or Microsoft® PlayReady™ content access technology), including but not limited to content packaging servers or services, licensing servers or services, certificate authority (ies) that issue digital identity certificates, key generation services, and verification servers or services. As shown, content packaging servers and/or services, which are responsible for protecting DCIs using one or more cryptographic schemes or techniques, may transmit certain content protection information 121 (discussed further below) to other servers and/or services, such as license servers and/or services, in accordance with the DRM techniques discussed herein. Licensing servers and/or services are operable to create and distribute digital licenses 161 to CED 102, either before or during/with consumption by user 111/CED 102 of DCIs 115 covered by the digital licenses.

Digital licenses 161 are electronic items or techniques operative to grant one or more rights to an entity under one or more intellectual property rights (which may be held by one or more content providers) protecting particular DCIs 115. Examples of grants under intellectual property rights include the rights granted under copyrights to use, reproduce, or distribute a particular DCI 115. Rights granted under intellectual property rights may also be restricted in various ways, for example, in accordance with conditions, which reflect intellectual property holders' preferences regarding how DCIs 115 are distributed or consumed, to whom (or to which devices) they are distributed, when or where they are distributed or consumed, and which portions of DCIs may or must be distributed or consumed. Digital licenses 161 also include keys, which are electronic items or techniques usable to verify and manage consumption of digital content item information protected by any cryptographic scheme or technique.

Collectively, networks 110 represent any existing or future, public or private, wired or wireless, wide-area or local-area, packet-switched or circuit-switched, one-way or two-way digital data transmission infrastructures or technologies. Exemplary networks 110 include: the Internet, managed wide-area networks (for example, cellular networks, satellite networks, fiber-optic networks, co-axial cable networks, hybrid networks, copper wire networks, and over-the-air broadcasting networks); and local area networks (for example, wireless local area networks and personal area networks.

CED 102 is any electronic device (or any physical or logical element of such an electronic device, either standing alone or included in other devices), which is configured for communication via any network within communication architecture 100 to obtain DCIs 115 and digital licenses 161 therefrom, and use DRM engine 118 to manage consumption of DCIs 115 pursuant to digital licenses 161. DCIs 115 and digital licenses 161 regulating consumption of such DCIs may be distributed to CED 102 together or separately, at the same time or at different times, prior to or during/with user 111's consumption of DCIs 115. CED 102 may be configured to render DCIs 115, or alternatively to pass DCIs 115 to a device configured to render DCIs 115. User 111 is a person authorized to operate CED 102, who is generally a consumer of DCIs 115. Examples of CED 102 include but are not limited to PCs, mobile phones, personal digital assistants, personal media players, computer/television devices, set-top boxes, hard-drive storage devices, video cameras, DVD players, cable modems, local media gateways, and devices temporarily or permanently mounted in transportation equipment such as wheeled vehicles, planes, or trains.

Advertising content and program content DCIs 115 are often consumed differently—while consumers may actively seek to discover, consume, and share new program content, they often attempt to avoid the consumption of advertising content. DRM systems and techniques are largely dedicated to supporting the interests of program content providers, who are generally concerned with reducing the likelihood that consumers will illegally over-consume or share program content; it has been counterintuitive to apply DRM systems and techniques to advertising content, whose providers may be very happy if advertising content consumption is excessive or if advertising content is copied or shared. The DRM techniques discussed herein efficiently and simultaneously address the diverse commercial and legal interests of different types of content providers, while also meeting the needs of users for flexible, user-friendly, and secure content consumption.

Figure 2:
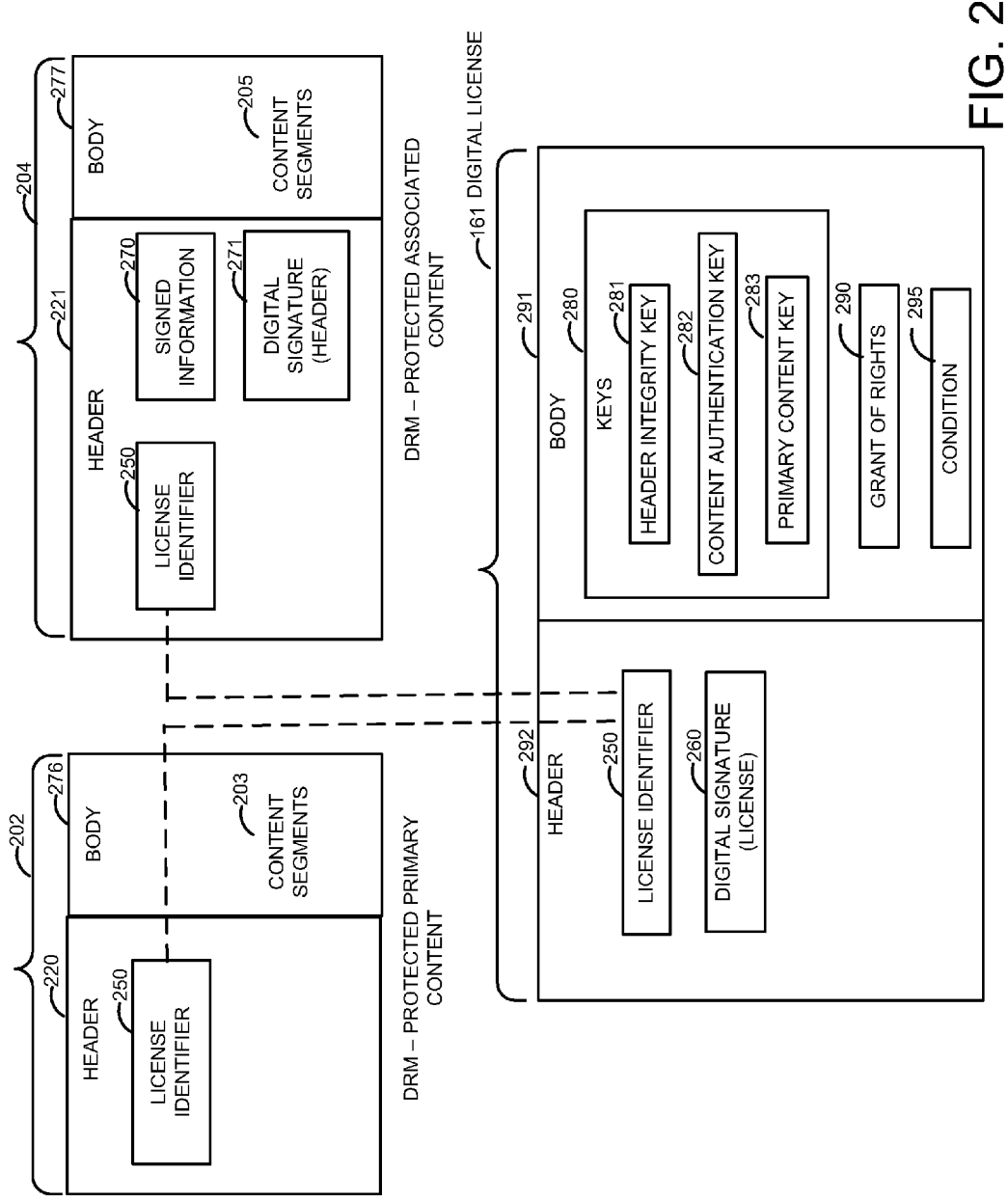
FIG. 2 is a simplified block diagram illustrating certain data structures, along with exemplary content thereof and relationships therebetween, used by aspects of the communication architecture shown in FIG. 1.

With continuing reference to FIG. 1, FIG. 2 is a simplified block diagram illustrating certain data structures, along with exemplary content thereof and relationships therebetween, used by aspects of communication architecture 100 in the creation and distribution of DCIs 115 and digital licenses 161 for consumption by CED 102/user 111. In the exemplary scenario illustrated in FIG. 2, user 111 desires to consume DRM-protected primary content 202 (such as a movie, television show, song or a portion thereof), which is associated by one or more digital licenses (one shown) 161 with DRM-protected associated content 204 (such as one or more digital advertisements playable before or during presentation of primary content 202). Generally, both primary content 202 and associated content 204 are composed of a number of ordered content segments (for example, time-ordered or numerically-ordered content segments), 203 and 205, respectively, which are playable by a particular CED as content streams. Content segments are generally playable in a serial fashion, although content segments from different content streams may be interspersed. It will be appreciated, however, that concurrent play and other timing scenarios are also possible. Individual content segments can be uniquely identified using one or more of the following items of information: a stream identifier; a content sample identifier; an offset location of the content sample within the stream; and/or a content sample size.

As shown in FIG. 2, the data structure associated with primary content 202 includes a header portion 220 and a body portion 276. Header portion 220, which may be implemented as multiple header portions, includes a license identifier 250 (discussed further below). Body portion 276 encapsulates content segments 203 (which may optionally be encrypted using any desired known or later developed encryption algorithm) of the primary content. The data structure associated with associated content 204 also includes a header portion 221 and a body portion 277. Header portion 221, which may be implemented as multiple header portions, includes license identifier 250, signed information 270 (discussed further below), and a digital signature 271 (of a content packaging server/service) associated with the header portion. Body portion 277 encapsulates content segments 205 (which may also optionally be encrypted using any desired known or later developed encryption algorithm) of the associated content. The data structure associated with digital license 161 includes a header portion 290, which further includes a license identifier 250 and a digital signature 260 (generated by a license server/service) associated with the license identifier, and a body portion 291, which further includes a grant of rights 290, a condition 295, and keys 280 (all discussed further below). It will be appreciated that the encapsulation schemes illustrated in FIG. 2 are exemplary in nature, and that other data packetization/encapsulation schemes are possible.

In accordance with one technique for addressing the diverse commercial and legal interests of provider(s) of primary content 202 and associated content 204, certain signed information 270 based on at least some content segments 205 is inserted by an entity operating a content packaging server or service within a portion of the data structure encapsulating associated content 204. As shown, signed information 270 (or a reference thereto) is stored within header portion 221, although signed information 270 (or a reference thereto) may be stored at one or more locations within body portion 277 or elsewhere. In one possible implementation, signed information 270 is a table used to store hash values of information associated with arbitrarily or carefully selected content segments 205. Hash values may be used as indices into the hash table, which enables fast lookup of content segments. Exemplary information for a particular content segment includes but is not limited to: a stream identifier, a sample identifier, a sample offset location within the stream, and a hash length. In one scenario, signed information 270 constitutes a complete or partial map of content segments 205.

Hash values may be created using any hash algorithm now known or later developed (for example, the SHA algorithm). The packaging entity may forward information regarding signed information 270 to a license server or service, which includes within digital license 161 a mechanism for CED 102 to verify signed information 270. The exemplary mechanism for verifying signed information 270 discussed herein is Content Authentication Key ("CAKey") 282 (discussed further below, in connection with digital license 161), which is generally usable to verify particular content segments 205 during the CED's consumption of associated content 204.

A list of verifiable content segments 463 (shown in FIG. 6 and discussed further below) is used to determine which content segments 205 to authenticate (and verify consumption thereof) with reference to signed information 270. In one possible implementation, the list of verifiable content segments is a digest of signed information 270, or a reference thereto. The list of verifiable content segments may be included or referenced within digital license 161, one or more portions of the data structure associated with primary content 202, one or more portions of the data structure associated with associated content 204, CED 102, or a separate network-based location.

The reference to signed information 270 (for example, the table of hashes itself or a reference thereto), and optionally the list of verifiable content segments 463, is also protected via a cryptographic scheme or technique to further discourage tampering. In one exemplary implementation, digital signature cryptography, which is a type of asymmetric cryptography used to provide authentication of signed information—in this case the signed information 270, the list of verifiable content segments or references thereto, and/or header 221 (or other data structure)—is protected via digital signature 271, generated by the packaging server or service. A digital signature cryptography scheme generally involves three algorithms-a key generation algorithm (implemented by a third party key generation service or certificate authority) that produces a "key pair," which includes a verifying key (generally a public key) and a signing key (generally a private key); a signing algorithm (implemented by a content packaging server or service) that takes signed information and the signing key as inputs and outputs a digital signature (such as digital signature 271), which is an object that can be embedded inside of a data structure such as the data structures (for example, header 221) associated with associated content 204; and a signature verifying algorithm (implemented by a networked server/service or CED 102) that takes signed information, the verifying key, and a digital signature, and either verifies or rejects the digital signature. An entity's public key (which may be used for purposes other than digital signatures, such as public-key encryption) is tied to the entity by a digital identity certificate issued by a certificate authority. An entity's identification information (for example, name, address, phone number, and the like) is bound to the public key, and the public key is used as a form of identification.

In the context of digital signature 271, information usable to verify digital signature 271 may be located in one or more places, such as within digital license 161, primary content 202, or associated content 204. The packaging entity may reveal the location of such information (such as a link to a certification authority or a digital identity certificate) usable to verify digital signature. The exemplary mechanism for verifying digital signature 271 discussed herein is Header Integrity Key ("HIKey") 281 (discussed further below, in connection with digital license 161).

Referring again to FIG. 2, one exemplary manner of associating primary content 202 and associated content 204 is via digital license 161. As shown, header 220 of the primary content data structure, header 221 of the associated content data structure, and header 290 of the digital license data structure include the same license identifier 250 (it will be appreciated, however, that any association technique that ensures that a license issuer can cryptographically authenticate that certain content is coming from a particular packaging server or service may be used). License identifier 250 may be generated by a license server/service and provided to content packaging server(s)/service(s) responsible for packaging DCIs 115, or vice-versa. It will be appreciated, however, that multiple, logically-linked digital licenses 161 are also possible. For example, separate digital licenses 161 may be created for primary content 202 and associated content 204, and directly or indirectly linked cryptographically or via grants of rights 290 and/or condition 295 (discussed further below). In one scenario, CED 102 sends information within header 220 (for example, license identifier 250) to a license server/service, which verifies header 220, creates an additional digital license 161 for associated content 204, and distributes the additional license 161 to CED 102. Associated content 204 may be distributed to CED 102 in a variety of ways (such as via downloading, streaming, broadcasting, and the like), before or during/with digital license 161.

To ensure that digital license 161 is not tampered with, header 290 and/or license identifier 250 may be cryptographically protected. In one possible implementation, digital license 161 and/or license identifier 250 are protected via digital signature cryptography. In the context of digital signature 260 generated by a license server/service, information usable to verify digital signature 260 may be located in one or more places, such as within digital license 161, primary content 202, or associated content 204. The exemplary mechanism for verifying digital signature 260 discussed herein is one or more verifying/public keys (such as license identifier 250) accessible by CED 102, which are tied to licensing server/service by a digital identity certificate issued by a certificate authority. For example, the identity certificate or reference thereto that enables access to verifying keys may be included within header 220, header 221, or elsewhere. Then, CED 102 (or a network-based verification service) would input to a signature verification algorithm the following information: license identifier 250; the verifying key; and digital signature 260 to be verified. Once digital signature 260 is verified, CED could access grant of rights 290 and/or one or more keys 280 within license 161 that cryptographically protect content segments 203 and/or 205 and signed information 270.

Grant of rights 290 is a grant under one or more intellectual property rights associated with a particular DCI 115, such as primary content 202 or associated content 204. Condition 295 specifies an amount or quantity of associated content 204 to be consumed by user 111 of CED 102. In one possible implementation, list of verifiable content segments 463 (shown in FIG. 4, discussed above) may serve to specify the condition to be satisfied with respect to consumption of the associated content by a user of a particular CED—the condition may be satisfied by user consumption of a quantity of content segments (for example, the list of verifiable content segments 463 or expressions relating thereto). For example, the condition may be satisfied via a certain total consumption time, consumption of a number of consecutive content segments, or a general number of content segments. It will be appreciated, however, that the condition may be specified separately from the verifiable segments list, and identification of the portion of the associated content to be consumed to satisfy the condition may be accomplished via reference to another location, such as a location within the data structure encapsulating the primary content, the data structure encapsulating the associated content, a location within the digital license, a location within the CED, or a location within a networked server or service.

Exemplary keys 280 included within digital license 161 include but are not limited to: HIKey 281, CAKey 282, and PCKey 283. As discussed above, license identifier 250 and/or CED's public key are used to verify digital signature 260 of digital license 161, and to decrypt keys 280. HIKey is accessible once digital signature 260 is verified, and usable to verify digital signature 271. In one exemplary implementation, HIKey is a public key that is input (by CED 102 or a separate network-based verification server or service)—along with digital signature 271 and the purportedly signed information—to a signature verifying algorithm that either verifies or rejects digital signature 271.

Once digital signature 271 has been verified, CAKey 282 is accessible and usable to access/verify signed information 270 (for example, the table and/or hash values) during CED 102's consumption of associated content 204. In one exemplary implementation, CAKey is a symmetric or asymmetric key (optionally encrypted using the CED 102's public key). The CAKey is input (by CED 102 or a network-based verification server or service), along with the purportedly hashed information, to a hash verification algorithm that either verifies or rejects the signed information.

Once signed information 270 is verified and the condition with respect to consumption of associated content 204 has been satisfied, optional PCKey 283 is accessible and usable to decrypt content segments 203 or access a different digital license governing consumption of primary content 202. In one exemplary implementation, the PCKey is a symmetric or asymmetric key (optionally encrypted using the CED's public key) that is accessible once condition 295 is satisfied.

Figure 3:
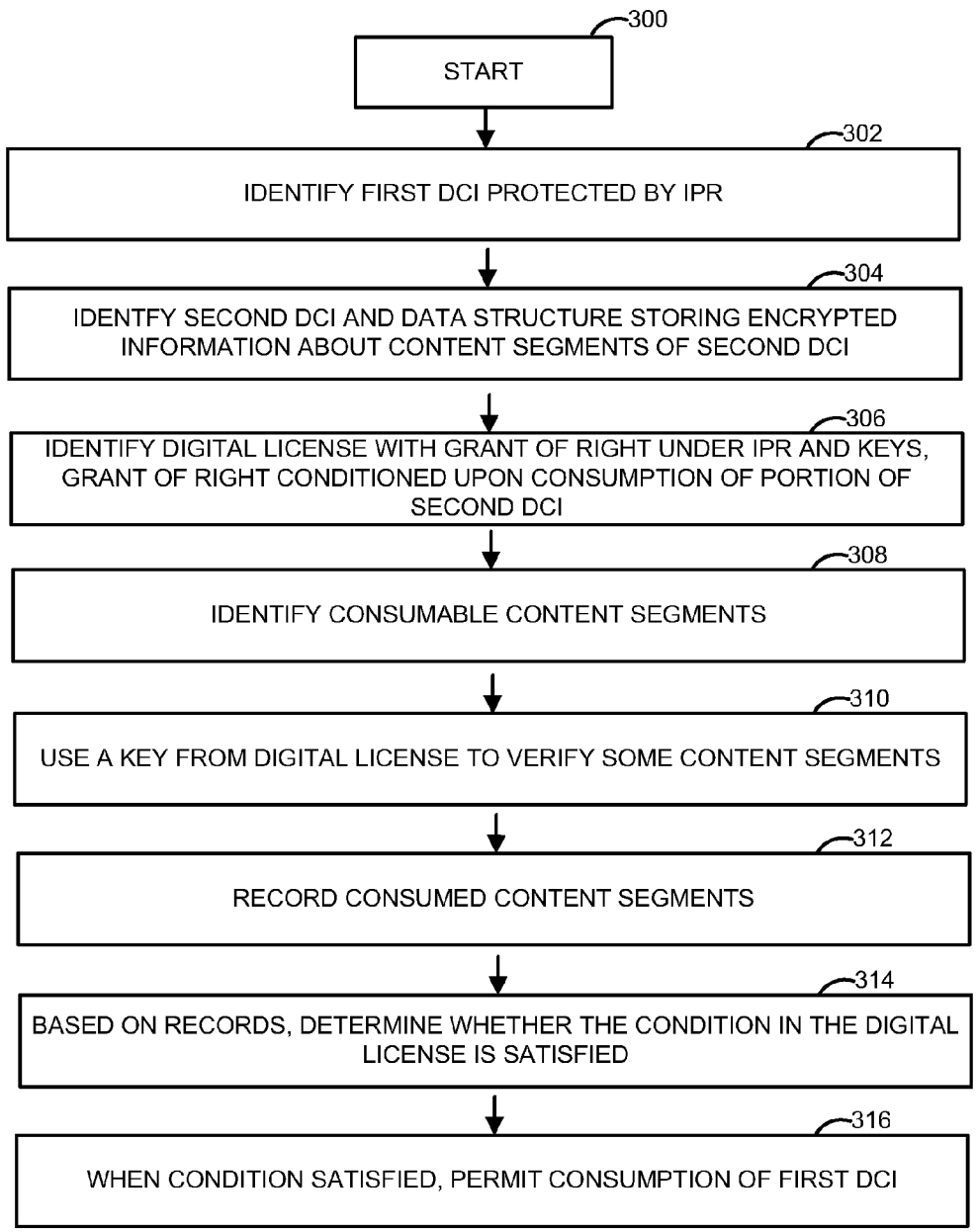
FIG. 3 is a flowchart of a method for consuming digital content using aspects of one or more of the data structures illustrated in FIG. 2.

With continuing reference to FIGS. 1 and 2, FIG. 3 is a flowchart of an exemplary method for consuming digital content using aspects of one or more of the data structures illustrated in FIG. 2. The method shown in FIG. 3 may be implemented in one or more general, multi-purpose, or single-purpose processors, such as processor 402 discussed below in connection with FIG. 4. Aspects of the illustrated method may be performed by networked servers and/or CED 102 (via DRM engine 118, for example)—for exemplary purposes, both CED-side acts and network-side acts are illustrated. Unless specifically stated, the methods described herein are not constrained to a particular order or sequence. In addition, some of the described method or elements thereof can occur or be performed concurrently. The method relates to a cryptographically robust technique for ensuring that certain advertising content is consumed in conjunction with certain program content. It will be appreciated, however, that the method of FIG. 3 is exemplary in nature, and that the subject matter defined in the claims is not necessarily limited to the specific features or acts described below. Rather, the specific features and acts described above are disclosed as example forms of implementing the claims.

The method begins at block 300, and continues at block 302, where a first DCI 115, such as primary content 202 (for example, program content), which is protected by an intellectual property right, is identified. Next, at block 304, a second DCI 115, such as associated content 204 (for example, advertising content) is identified, which has a data structure (for example, header portion 221) storing signed information 270 (such as a table of hashes) about at least some content segments 205. At block 306, a digital license, such as digital license 161, is identified, which includes grant of rights 290 under one or more intellectual property rights protecting primary content 202, and a condition, such as condition 295 to be satisfied with respect to consumption by user 111 of CED 102 of a portion of associated content 204 prior to exercise of the grant of rights 290.

In one possible scenario, CED 102 has received a particular program content file, or a program content file header such as header 221, which identifies and provides a URL (via license identifier 250, for example) for a license server/service from which digital license 161 may be obtained. It will be appreciated that the steps discussed herein are applicable to both license pre-delivery and license post-delivery scenarios. Associated content 204 may be identified via primary content 202, digital license 161, or a separate network server and/or service. For example, primary content 202 may be associated (via digital license 161 or in another manner) with one or more digital advertisements and/or metadata obtained by CED 102 together with or separately from primary content 202. Primary content 202 and associated content 204 may be single files or multiple files.

License identifier 250 and/or CED's public key are used to verify digital signature 260 of digital license 161, and to verify and/or access grant of rights 290, condition 295, and one or more keys 280. Condition 295 may be specified within digital license 161 via a list of verifiable content segments (which may be, or may be based on, signed information 270) or expressions relating thereto, or in another manner, such as via reference to a location within the data structure encapsulating primary content 202, the data structure encapsulating associated content 204, a location within digital license 161, a location within CED 102, or a location within a separate networked server or service.

HIKey is accessible once digital signature 260 is verified, and usable to verify digital signature 271, which protects header 221 and/or signed information 270 from tampering. In one exemplary implementation, HIKey is a public key that is input (by CED 102 or a separate network-based verification server or service)—along with digital signature 271 and the purportedly signed information—to a signature verifying algorithm that either verifies or rejects digital signature 271.

Referring again to FIG. 3, at block 308, consumable content segments are identified by CED 102 during consumption of associated content 204. At block 310, a key, such as CAKey 282, from digital license 161 is used to verify at least some consumable content segments. A list of verifiable content segments (which may be, or may be based on, signed information 270) may be located within digital license 161, the data structure associated with primary content 202, the data structure associated with associated content 204, CED 102, or a networked server or service. In the context of the data structures shown in FIG. 2, once digital signature 271 has been verified, CAKey 282 is accessible and usable to access/verify verifiable content segments with reference to signed information 270 during consumption of associated content 204. In one exemplary implementation, CAKey is a symmetric or asymmetric key (optionally encrypted using the CED 102's public key). The CAKey is input (by CED 102 or a network-based verification server or service), along with the purportedly hashed information, to a hash verification algorithm that either verifies or rejects the signed information.

At block 312, information regarding consumed content segments is recorded. At block 314 it is determined, based on the recorded information, whether condition 295 has been satisfied. Consumption of primary content 202 is permitted, as indicated at block 316, when condition 295 is satisfied. In the context of the data structures shown in FIG. 2, once signed information 270 is verified and condition 295 with respect to consumption of associated content 204 has been satisfied, optional PCKey 283 is accessible and usable to verify content segments 203 or access a different digital license governing consumption of primary content 202. In one exemplary implementation, the PCKey is a symmetric or asymmetric key (optionally encrypted using the CED's public key) that is accessible once condition 295 is satisfied.

In this manner, cryptographically robust authentication of both program content and advertising content, and flexible user consumption models, are possible, while simultaneously supporting the often diverse commercial and legal interests of program content providers (including application providers), advertising content providers, and users of CEDs. For example, it is possible to determine at the time of issuance of a digital license what content segments are to be authenticated during consumption and/or consumed, which may be especially useful in custom advertising scenarios—advertising techniques such as the utilization of interactive advertising, the use of mixed formats and alternative media types, and the insertion of up-to-date advertising are made possible. In another example, advertising content may be delivered together or separately from program content, the various content items may be in single-file or multiple-file formats, and signed information 270 (or references thereto) may be inserted at various locations (such as within top-level headers or injected into broadcast or streamed media) to securely and robustly ensure that advertising content is consumed at predetermined points within program content. This enables, among other things, customized advertising to be provided as users play back recorded program content or receive program content in real-time, and sliding windows may be used to authenticate streaming or broadcast content.

Figure 4:
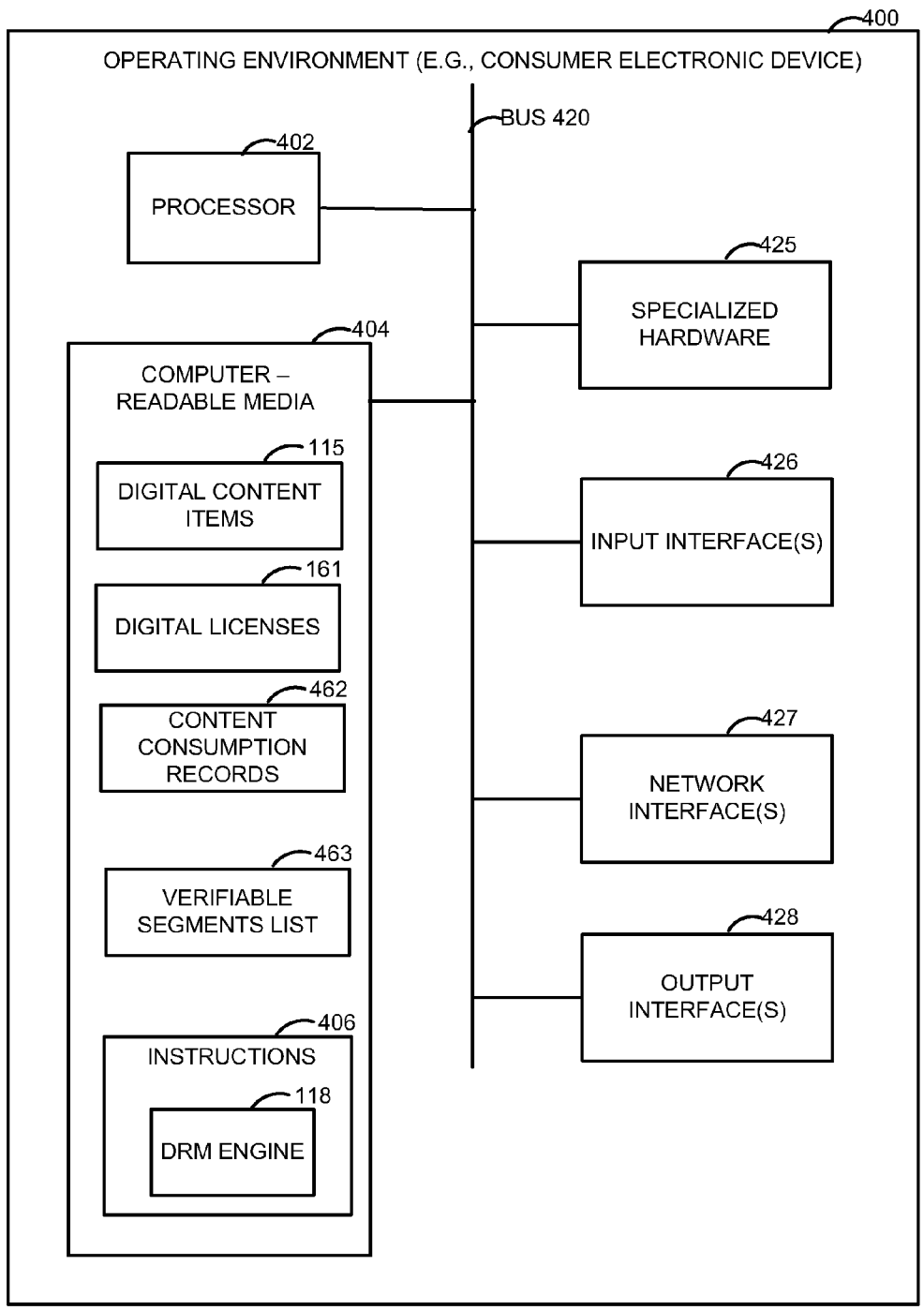
FIG. 4 is a simplified block diagram of an exemplary operating environment in which aspects of the communication architecture shown in FIG. 1, the data structures shown in FIG. 2, and/or the method(s) shown in FIG. 2 may be implemented or used.

With continuing reference to FIGS. 1 through 3, FIG. 4 is FIG. 4 is a simplified block diagram of an exemplary operating environment 400 in which aspects of the communication architecture shown in FIG. 1, the data structures shown in FIG. 2, and/or the method(s) shown in FIG. 3 may be implemented or used. Operating environment 400 is generally indicative of a wide variety of general-purpose or special-purpose computing environments, and is not intended to suggest any limitation as to the scope of use or functionality of the system(s) and methods described herein. For example, operating environment 400 may be a consumer electronic device such as a mobile phone, a personal digital assistant, a personal computer, a personal audio or video player, a computer/television device, a set-top box, a hard-drive storage device, a video camera, a DVD player, a cable modem, a local media gateway, a device temporarily or permanently mounted in transportation equipment such as a wheeled vehicle, a plane, or a train, or another type of known or later developed consumer electronic device. Operating environment 400 may also be a type of networked server, or any aspect thereof. Such a server may be part of a distributed computing network, and may be used to implement, host, or proxy a web service in whole or in part.

As shown, operating environment 400 includes processor 402, computer-readable media 404, specialized hardware 425, input interface(s) 426, output interface(s) 428, and network interface(s) 427. One or more internal buses 420 may be used to carry data, addresses, control signals and other information within, to, or from operating environment 400 or elements thereof. Computer-executable instructions 406 (such as DRM engine 118) are shown as being stored on computer-readable media 404, along with digital content items 115, digital licenses 161, content consumption records 462, and verifiable segments list 463.

Processor 402, which may be a real or a virtual processor, controls functions of operating environment 400 by executing computer-executable instructions 406. Processor 402 may execute instructions 406 at the assembly, compiled, or machine-level to perform a particular process.

Computer-readable media 404 represent any number and combination of local or remote devices, in any form, now known or later developed, capable of recording, storing, or transmitting computer-readable data. In particular, computer-readable media 504 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 504 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 406 represent any signal processing methods or stored instructions. Generally, computer-executable instructions 406 are implemented as software components according to well-known practices for component-based software development, and encoded in computer-readable media (such as computer-readable media 404). Computer programs may be combined or distributed in various ways. Computer-executable instructions 406, however, are not limited to implementation by any specific embodiments of computer programs, and in other instances may be implemented by, or executed in, hardware, software, firmware, or any combination thereof. As shown, certain computer-executable instructions 406 implement aspects of DRM engine 118.

Input interface(s) 426 are physical or logical elements that facilitate receipt of input to operating environment 400. Input may be received using any type of now known or later-developed physical or logical elements, such as user interfaces, remote controls, displays, mice, pens, styluses, trackballs, keyboards, microphones, scanning devices, and all types of devices that are used input data.

Output interface(s) 428 are physical or logical elements that facilitate provisioning of output from operating environment 400. Output may be provided using any type of now known or later-developed physical or logical elements, such as user interfaces, displays, printers, speakers, disk drives, and the like.

Network interface(s) 427 are one or more physical or logical elements such as connectivity devices or computer-executable instructions that enable communication by operating environment 400 via one or more protocols or techniques, at one or more layers of a communication protocol stack, such as the OSI Internetworking Model.

Specialized hardware 425 represents any hardware or firmware that implements functions of operating environment 500. Examples of specialized hardware 530 include tuners, video or audio encoder/decoders ("CODECs"), application-specific integrated circuits, buffers, demultiplexors, decryptors, and the like.

It will be appreciated that particular configurations of operating environment 400 may include fewer, more, or different components or functions than those described. In addition, functional components of operating environment 400 may be implemented by one or more devices, which are co-located or remotely located, in a variety of ways.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. An electronic device for presenting digital content, the device comprising:
    a computer-readable storage medium, not comprising a propagated signal, storing computer-executable instructions; and
    a processor responsive to the computer-readable storage medium the processor when executing the computer-executable instructions performs the steps of:
        accessing a digital license including a key responsive to an input from the electronic device, the digital license including a digital license identifier, a grant under an intellectual property right to access a primary digital content item associated with the digital license identifier, and a condition to which the digital license is subject, wherein the condition further specifies required consumption of a predetermined number of content segments of the secondary digital content item;
        identifying, using the digital license identifier in the primary digital content item, a secondary digital content item comprising an associated data structure storing the digital license identifier and including a plurality of content segments, wherein the data structure further stores signed information about at least some of the plurality of content segments;
        verifying, using the key, the integrity of the signed information of the secondary digital content item to permit presentation by the electronic device of verified content segments of the identified secondary digital content item;
        repeatedly identifying and presenting the verified content segments of the secondary digital content item;
        recording information associated with amount of presented content segments of the secondary digital content item;
        determining from the recorded information whether the predetermined number of content segments were presented during the presentation of the secondary digital content item to satisfy the condition; and permitting the electronic device to access the primary digital content item associated with the digital license identifier only when the condition has been satisfied.

2. The device according to claim 1, wherein the device includes a network interface and further comprises the step of storing the predetermined amount in a location selected from the group comprising: the digital license; the data structure; a consumer electronic device; and a network-based server or service provider accessed by the device using the network interface.

3. The device according to claim 1, further comprising the step of storing at least one of the digital license, the primary digital content item, the secondary digital content item, and the predetermined amount at a location remote from the device, and wherein the device further comprises a network interface for accessing any remotely located license, item or amount.

4. The device according to claim 1, wherein the step of identifying a secondary digital content item further comprises identifying a secondary digital content item having a plurality of subsets of content segments, each subset of content segments having a data structure associated therewith for storing signed information based on at least some of the content segments of the subset.

5. A method for consuming digital content using an electronic device, the method performed by a processor and comprising the steps of:
providing by the processor, a primary digital content item associated with a digital license identifier;
identifying, by the processor using the digital license identifier in the primary digital content item, a secondary digital content item comprising the digital license identifier and a plurality of content segments, the secondary digital content item including a data structure associated therewith, the data structure storing information about at least some of the plurality of content segments, wherein the digital license comprises:
the license identifier;
a grant under an intellectual property right to access the primary digital content item;
a condition requiring consumption of a predetermined number of content segments of the secondary digital content item, and
a plurality of keys for decrypting information associated with the primary digital content item and the secondary content item;
verifying, by the processor using one of the plurality of keys from the digital license, at least some of the content segments of the secondary digital content item in response to an input to the electronic device to permit consumption of the secondary digital content item;
consuming by the processor, the secondary digital content item by repeatedly identifying and providing the verified content segments of the secondary digital content item to the electronic device;
recording, by the processor, information associated with the quantity of consumed content segments of the secondary digital content item;
determining, by the processor, whether the recorded information indicates that the condition requiring consumption of the predetermined number of content segments of the secondary digital content item has been satisfied; and
permitting, by the processor, the electronic device in consumption of the primary digital content item based on the determination that whether the recorded information indicates that the condition requiring consumption of the predetermined number of content segments of the secondary digital content item has been satisfied.

6. The method according to claim 5, wherein:
storing a portion of the secondary digital content item consumable to satisfy the condition in a location selected from the group comprising: the digital license; the data structure; a consumer electronic device; and a network-based server or service provider, wherein
the portion is specified in a manner selected from the group comprising: a list of individual content segments; a list of consecutive content segments; and a play time of all or a portion of the second digital content item.

7. The method according to claim 5, further comprising:
attempting to verify the secondary digital content item using the key from the digital license before or during consumption of the secondary digital content item; and
performing the consuming step when the secondary digital content item is verified.

8. The method according to claim 5, further comprising consulting a list of verifiable segments to ascertain which of the content segments to verify, the list of verifiable segments being stored in a location selected from the group comprising: the second digital content item; the digital license; a consumer electronic device; and a network-based server or service provider.

9. The method according to claim 5, wherein the step of accessing the digital license comprises:
receiving the digital license on a consumer electronic device operable by a user, the digital license received by the consumer electronic device before, during, or after receipt by the consumer electronic device of the primary digital content item or the secondary digital content item or both.

10. The method according to claim 5, further comprising storing the primary digital content item or the secondary digital content item or both on a computer-readable medium accessible by a consumer electronic device operable by a user, the computer-readable medium being resident at a location selected from the group comprising: a local computer-readable storage medium; a remote computer-readable storage medium; and a broadcast communication channel.

11. The method according to claim 5, wherein:
the primary digital content item comprises a portion of an item of media program content, and the secondary digital content item comprises a digital advertising; and
the primary digital content item or the secondary digital content item or both comprise multiple files.

12. The method according to claim 5, wherein the electronic device comprises a consumer electronic device.

13. The method according to claim 5, wherein at least one of the steps of accessing the digital license, providing the primary digital content item, and providing the secondary digital content item is performed using a networked server computer.

* * * * *